Aug. 6, 1940.  J. T. CRONKHITE  2,210,751
AUTOMATIC SHUTOFF VALVE
Filed June 3, 1939   2 Sheets-Sheet 1
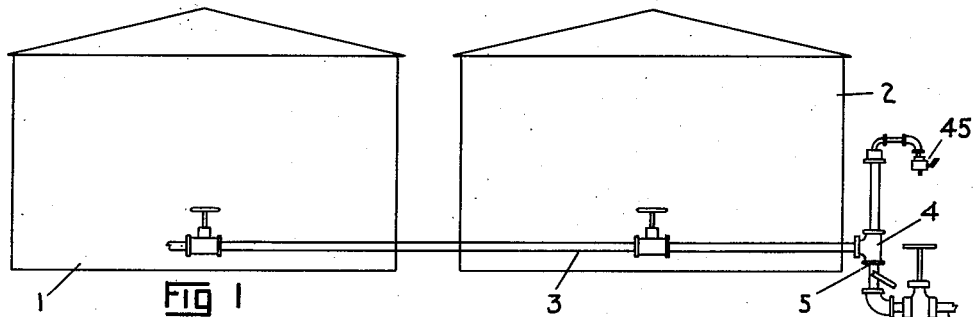
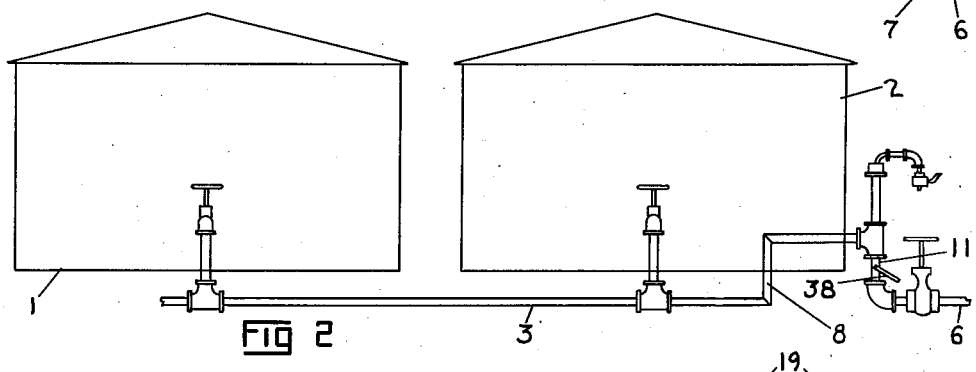
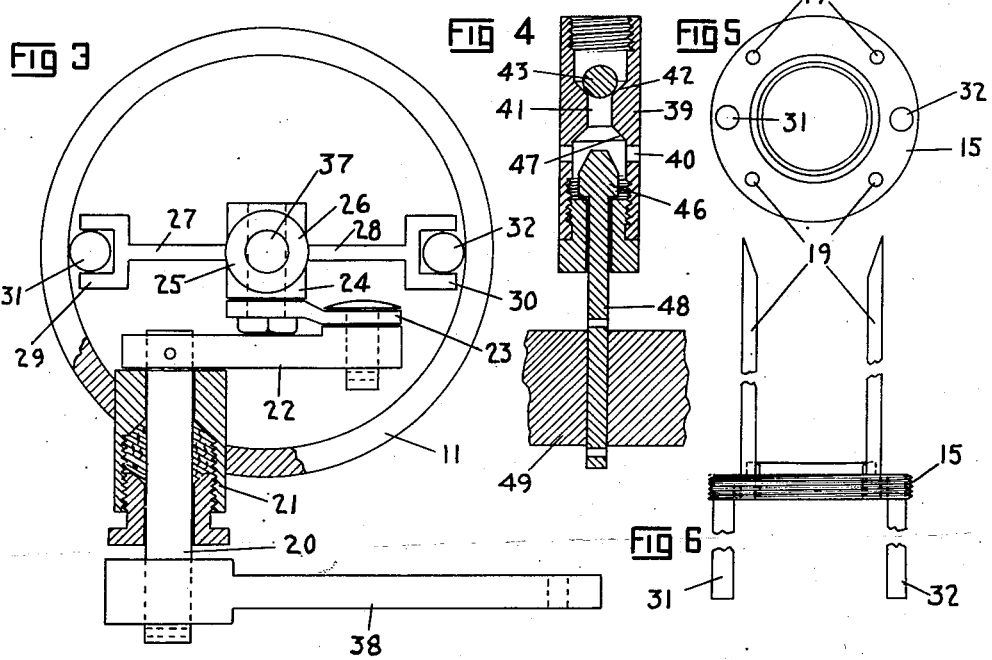
INVENTOR.
John T. Cronkhite

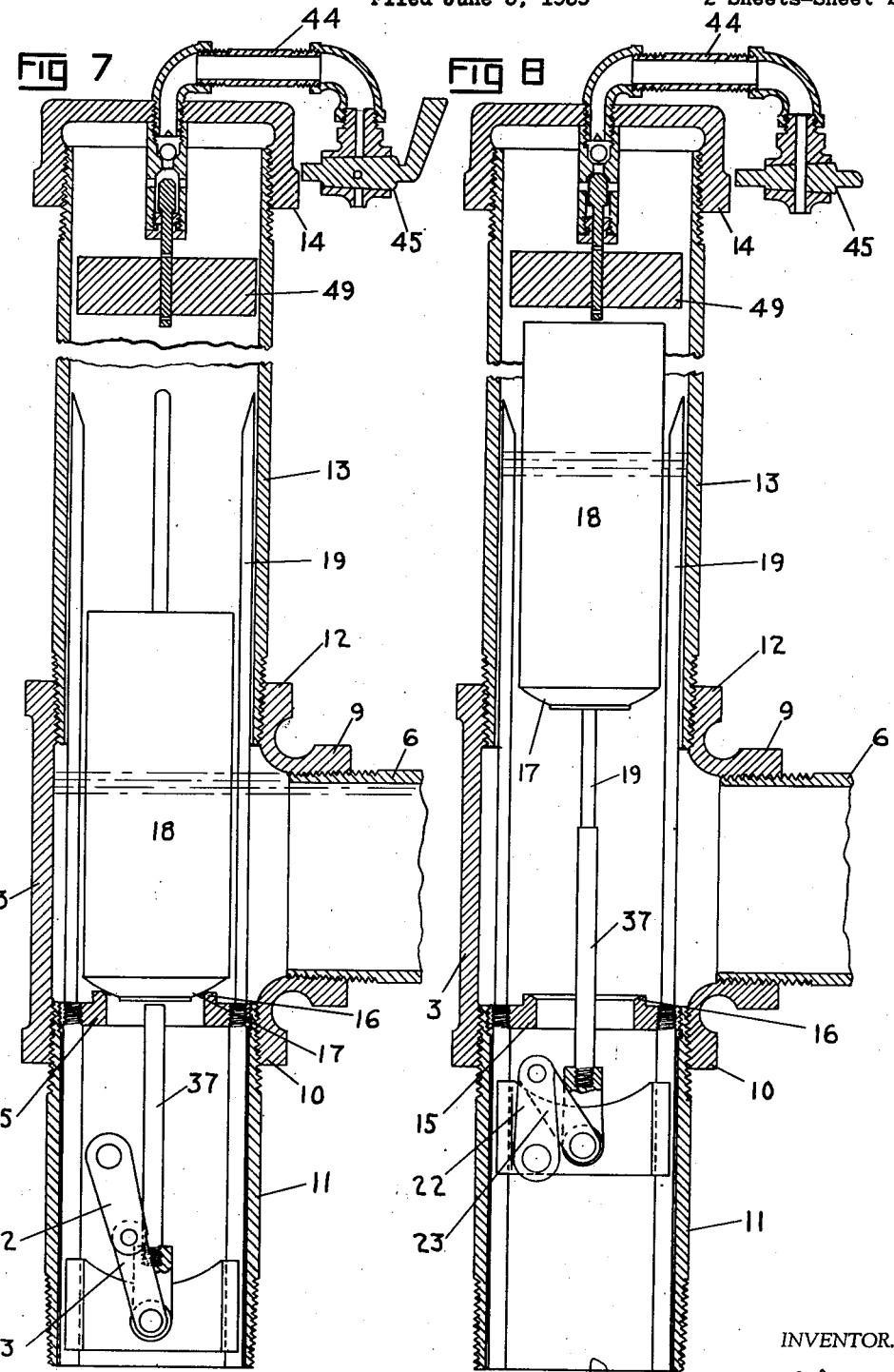

Patented Aug. 6, 1940

2,210,751

UNITED STATES PATENT OFFICE 2,210,751

AUTOMATIC SHUTOFF VALVE

John T. Cronkhite, Wichita, Kans.

Application June 3, 1939, Serial No. 277,179

5 Claims. (Cl. 137—68)

This invention relates to automatic shutoff valves particularly designed for pipe lines and the like.

It is common practice to convey oil from storage tanks to loading docks or other tanks through lines of considerable length. It is common practice to have a number of storage tanks connected to one main line, and heretofore difficulty has been encountered in the operation of the system because of the introduction of air in the pipe line.

There are various causes of air entering the pipe line, the first being that if one of the storage tanks is emptied and no valve is provided in the line for shutting off communication between the empty tank and line, the pull of air through the line either by pump or gravity will cause air to enter the line. This difficulty is well known in the oil industry and various attempts have been made to overcome the inclusion of air in the line, but previous devices have been more or less bulky and cumbersome, so I have provided a simple, easily installed, and inexpensive construction of automatic shutoff to exclude air from the line below the valve, and I have provided means in conjunction with the valve for eliminating any air entering the line.

The novelty of my invention will be understood by reference to the accompanying drawings, to wit:

Fig. 1 is a side elevational view of a pair of storage tanks and part of the flow line showing my invention installed, the tanks being above the ground.

Fig. 2 is a similar view showing the headers below the ground.

Fig. 3 is an enlarged end view of a float-valve lifter.

Fig. 4 is a sectional view through the bleeder valve.

Fig. 5 is an end view of the valve seat showing the valve cage and parts of the guide for the head of the valve lifter.

Fig. 6 is a sectional view of the valve seat showing parts of the valve cage and the valve lifter head guide.

Fig. 7 is an enlarged vertical longitudinal sectional view of the shutoff valve showing the valve in seated position, and Fig. 8 is a similar view showing the valve unseated.

Referring now to the drawings by numerals of reference. In Fig. 1 numbers 1 and 2 designate two tanks above the ground connected into a header 3 which communicates with the valve casing 4 of the shutoff valve. The discharge end 5 of the shutoff valve is connected to the flow line 6, in which is a mechanically operated shutoff valve 7.

In Fig. 2 a similar construction is employed with the exception that the header 3 has an offset or elbow portion 8 to locate the shutoff valve casing 4 above the ground, even though the header 3 is located below the ground.

As heretofore explained, the purpose of the invention is to reduce the liability of air entering the line 6. The novel method of accomplishing this is best illustrated in Figs. 7 and 8, in which the valve casing 3 is shown as consisting of a T having its inlet 9 in communication with the pipe 6 and its outlet 10 discharging into pipe 11 which communicates with the main flow line leading to the storage tanks or other means provided for receiving the oil pumped through the line, it being understood that the flow in the line is induced by gravity or by a suction pump for boosting the flow from the storage tank to the points of delivery.

The upper end 12 of the T is provided with a float chamber here shown as consisting of a pipe 13, having a cap 14 for closing the upper end so that the valve casing or head of the T is in constant communication with the float chamber.

At the outlet end of the valve casing is a disc like plug 15 which may be threaded in the pipe 11 or in the T, and said plug is provided with a conical valve seat 16 to receive the conical end 17 of a float-valve 18. The float-valve 18 is guided in actual alignment with the opening surrounded by the valve seat, by a valve cage which consists of equi-distantly located vertical guide rods 19 carried by the valve seat member 15. The upper ends of the rods 19 surround a space larger than that surrounded by the remaining portion of the rods so that a flared effect is provided to locate the valve in proper actual alignment with its seat. The float chamber 13 is preferably long enough to permit the float 18 to be entirely received thereby, and it is desirable that the float 18 move high enough from its seat during the flow of oil so that it will be out of the major portion of the flow of liquid through the valve casing.

By reference to Figs. 3, 7, and 8, it will be observed that the float 18 is provided with a valve lifter located below the seat. The valve lifter includes a shaft 20 in a stuffing box 21 in the pipe 11, and on the inner end of the shaft 20 is a crank 22 loosely connected to a link 23, which in turn is loosely connected to the boss 24 on the lifter head 25. The lifter head consists of a finger socket 26, having oppositely disposed webs or wings 27 and 28, which with grooved ends 29 and 30, receive the guide rods 31 and 32 rigidly carried by and depending from the plug 15, so that the liability of the head 27 having any axial movement will be eliminated. The socket 36 carries an upstanding finger 37 which is of sufficient length to lift the float-valve 18 a considerable distance off its seat so that when it is unseated, oil can flow from the inlet to the outlet of the valve casing without interference by the float and without affecting the float toward seating engagement.

It will be obvious by reference to the drawings that when there is no flow of oil in the line, the valve 18 will seat upon its seat, as shown in Fig. 7, so that communication from the tanks to the sources of delivery will be shut off. When it is desired to establish communication between the storage tanks and the pump or other sources, the handle 38 can be manipulated to turn the shaft 20 to cause the crank and link and head 25 to lift the finger 37 against the bottom of the float 18, and raise it a considerable distance from its seat so that oil may flow through the outlet. The incoming oil will of course act as a buoyancy medium for the float, and it will substantially fill the float chamber 13 so that the float may be received in the float chamber.

When the oil or liquid passes up into the float chamber, any gaseous fluid will escape through the bleeder valve 39. This is shown as a tubular chamber, having air or gas inlets 40 in its side which communicate with a port 41 surrounded at the top by a check valve seat 42 to receive a check valve 43. The check valve is outwardly opening so that any gaseous fluid compressed by the column of liquid entering the float chamber passes through the bleeder valve member into the discharge pipe 44 preferably provided with a petcock 45 in the downwardly disposed end of the pipe 44. Any tendency for air to flow back into the float chamber will be eliminated by the check valve 43 in an obvious manner.

In order to prevent liquid from passing out through the bleeder valve member, I provide a float actuated valve 46 on which is a float 49. When the liquid rises a sufficient distance in the float chamber, the float 49 will rise with it and cause the valve 46 to seat upon the seat 47 so that no liquid may pass out through the bleeder valve.

If there is a tendency for the stem 48 to stick, the float 18 will assist the lift of the float 49 when it floats up into the float chamber, so liability of failure of the valve 46 will be eliminated.

In the event that the liquid level in one of the storage tanks is low enough to permit air to enter the header, there would be a tendency for air to be drawn from the tank into the float chamber. In that event, there would be no liquid in the float chamber, so the float-valve 18 will be immediately seated to close off communication between the empty tank and the pipe line until an attendant shuts off the outlet valve for the empty tank. When the valves for the liquid containing tank or tanks are opened, the oil from the tanks containing liquid will flow into the inlet and into the float chamber, but the float 18 will not unseat until it is lifted off its seat because there will be a certain amount of suction below the valve 18 due to the fact that the booster pump or gravity pull is a suction pull. The operator now turns the handle 38 so as to cause the finger 37 to lift the valve 18 off its seat above the flow line of the incoming liquid, and inasmuch as the liquid has entered into the float chamber, the buoyancy thereof will cause the float-valve 18 to remain in the float chamber off its seat, so the flow through the valve casing 3 will be unimpeded.

As heretofore explained, the entrance of liquid into the float chamber will cause the liquid to act as a piston to compress any vapor or gaseous liquid in the top of the float chamber, and this will be bled out through the bleeder valve. When the storage tank is shut off, the suction will pull the liquid from the float chamber to cause the float to reseat itself to the position shown in Fig. 7.

Attention is called to the fact that my device is so designed that the major portion of it may be constructed of standard pipe line fittings which are available everywhere, and thereby I am enabled to construct an efficient device in a very inexpensive manner, but I do not wish to be limited entirely to the use of pipe fittings, although the feature enables the device to be manufactured at a minimum cost.

Attention is also called to the fact that the float-valve unseating finger and the head 25 which supports it will be of sufficient weight, assisted by the flow of the liquid, to cause the finger to be retracted after it has been raised by the lever 38. This is of considerable importance because if the valve unseating finger is automatically retracted away from the valve seat, the seating of the float-valve will be assured when the liquid in the float chamber is lowered.

It will be apparent from the foregoing that the device for shutting off the communication between storage tanks and the sources of distribution until the air is disposed of, has marked advantages over existing devices—that the device is simple in construction, easily manufactured, and efficient for the purpose intended.

What I claim is:

1. An automatic cut off device for liquid-conducting lines comprising a casing having a side inlet, a bottom discharge opening and a float chamber at its top, a circular valve seat in the discharge opening, an independently movable float-valve bodily receivable in the float chamber, adapted to close the opening surrounded by the valve seat, a manually operable float valve lifter finger below the valve seat to bodily lift the float-valve above the lower portion of the side inlet to permit liquid entering through the inlet opening in the casing to flow through the discharge opening, a socket member for the lifter finger, oppositely disposed wings on the socket having grooves in their outer edges, fixed guide rods engaging the grooves in the edges of the wings, and a float actuated discharge valve permitting gaseous fluid to pass from the float chamber.

2. An automatic cut off device for liquid conducting lines comprising a casing having a side inlet, a bottom outlet opening and a float chamber at its top in open communication with the casing, a valve seat in the casing between the inlet and the outlet, a float-valve in the casing, receivable in the float chamber, float guides carried by the valve seat, a float-valve unseating finger normally below the valve seat projectable through it to unseat the valve, a weighted finger-centering member on the lower end of the finger having grooves, guide rods in the grooves, and means for actuating said finger.

3. An automatic cut off device for liquid conducting lines comprising a casing having a side inlet, a bottom outlet opening and a float chamber at its top in open communication with the casing, a valve seat in the casing between the inlet and the outlet, a float-valve in the casing, receivable in the float chamber, float guides carried by the valve seat, and a float-valve unseating finger normally below the valve seat projectable through it to unseat the valve, and means for actuating said finger, and weighted means below the valve seat for maintaining the finger in axial alignment with the opening surrounded by the valve seat and for urging the finger into retracted position.

4. An automatic cut off device for liquid conducting lines comprising a casing having a side inlet, a bottom outlet opening and a float chamber at its top in open communication with the casing, a valve seat in the casing between the inlet and the outlet, a float-valve in the casing, receivable in the float chamber, float guides carried by the valve seat, guide rods depending from the valve seat, a manually actuatable head engaging the guide rods and an upstanding valve unseating finger carried by the head projectable through the valve seat to raise the float-valve into the float chamber.

5. An automatic cut off device for liquid conducting lines comprising a casing having a side inlet, a bottom outlet opening and a float chamber at its top in open communication with the casing, a valve seat in the casing between the inlet and the outlet, a float-valve in the casing, receivable in the float chamber, float guides carried by the valve seat, guide rods depending from the valve seat, a manually actuatable weighted head engaging the guide rods and an upstanding valve unseating finger carried by the head projectable through the valve seat to raise the float-valve into the float chamber.

JOHN T. CRONKHITE.